US011842750B2

(12) United States Patent
Kanamitsu

(10) Patent No.: US 11,842,750 B2
(45) Date of Patent: Dec. 12, 2023

(54) COMMUNICATION TRANSMISSION DEVICE AND VOICE QUALITY DETERMINATION METHOD FOR COMMUNICATION TRANSMISSION DEVICE

(71) Applicant: Nippon Telegraph and Telephone Corporation, Tokyo (JP)

(72) Inventor: Takuo Kanamitsu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 90 days.

(21) Appl. No.: 16/968,298

(22) PCT Filed: Feb. 13, 2019

(86) PCT No.: PCT/JP2019/005107
§ 371 (c)(1),
(2) Date: Aug. 7, 2020

(87) PCT Pub. No.: WO2019/159968
PCT Pub. Date: Aug. 22, 2019

(65) Prior Publication Data
US 2020/0372928 A1 Nov. 26, 2020

(30) Foreign Application Priority Data
Feb. 15, 2018 (JP) .................... 2018-025372

(51) Int. Cl.
*G10L 25/60* (2013.01)
*G10L 19/00* (2013.01)
(Continued)

(52) U.S. Cl.
CPC .............. *G10L 25/60* (2013.01); *G10L 19/00* (2013.01); *G10L 21/0232* (2013.01);
(Continued)

(58) Field of Classification Search
CPC ..... G10L 25/60; G10L 21/0232; G10L 19/00; G10L 21/0272; G10L 25/69; H04B 3/23; H04M 3/22; H04M 3/2236
See application file for complete search history.

(56) References Cited

U.S. PATENT DOCUMENTS

| 4,675,863 | A | * | 6/1987 | Paneth | ...................... H04J 3/02 |
|---|---|---|---|---|---|
| | | | | | 370/50 |
| 6,215,992 | B1 | * | 4/2001 | Howell | ................... H04B 1/06 |
| | | | | | 455/412 |

(Continued)

OTHER PUBLICATIONS

Zero-Based Acoustics, Mar. 2014, Japanese Publication in Appln. No. PCT/JP2019/005107, 207 pages, (Statement of Relevancy only).

*Primary Examiner* — Richemond Dorvil
*Assistant Examiner* — Ethan Daniel Kim
(74) *Attorney, Agent, or Firm* — Fish & Richardson P.C.

(57) ABSTRACT

A communication transmitting apparatus is connected between IP telephones, and includes a tone storage unit configured to store tone data T that is unique, an adding unit configured to add the tone data T to the voice data V transmitted from the IP telephone to generate addition data, an arithmetic processing unit configured to convert a format of the addition data according to a prescribed specification to generate converted data including converted voice data Vc and tone data Tc, a separating unit configured to separate the tone data Tc from the converted data, and a comparison determination unit configured to determine that if the tone data T added to the voice data V before conversion performed by the arithmetic processing unit is different from the tone data Tc separated from the voice data Vc by the separating unit after the conversion, there is quality degradation in the voice data Vc.

15 Claims, 6 Drawing Sheets

(51) Int. Cl.
*G10L 21/0232* (2013.01)
*G10L 21/0272* (2013.01)
*G10L 25/69* (2013.01)
*H04B 3/23* (2006.01)
*H04M 3/22* (2006.01)
G10L 21/0208 (2013.01)

(52) U.S. Cl.
CPC .......... *G10L 21/0272* (2013.01); *G10L 25/69* (2013.01); *H04B 3/23* (2013.01); *H04M 3/2236* (2013.01); *G10L 2021/02082* (2013.01)

(56) References Cited

U.S. PATENT DOCUMENTS

| | | | | |
|---|---|---|---|---|
| 6,370,500 | B1 * | 4/2002 | Huang | G10L 19/00 |
| | | | | 704/208 |
| 6,823,302 | B1 * | 11/2004 | Atkinson | G10L 21/00 |
| | | | | 704/216 |
| 9,456,008 | B2 * | 9/2016 | Lawson | H04L 12/66 |
| 9,881,178 | B1 * | 1/2018 | Brown | G06F 21/62 |
| 10,135,993 | B2 * | 11/2018 | Shaltiel | H04M 3/42 |
| 2007/0160124 | A1 * | 7/2007 | Dorr | H04L 5/16 |
| | | | | 375/222 |
| 2011/0286585 | A1 * | 11/2011 | Hodge | H04M 1/66 |
| | | | | 379/88.02 |
| 2012/0128134 | A1 * | 5/2012 | Pappas | H04M 1/24 |
| | | | | 379/1.01 |

\* cited by examiner

COMMUNICATION TRANSMISSION DEVICE AND VOICE QUALITY DETERMINATION METHOD FOR COMMUNICATION TRANSMISSION DEVICE

CROSS-REFERENCE TO RELATED APPLICATIONS

This application is a National Stage application under 35 U.S.C. § 371 of International Application No. PCT/JP2019/005107, having an International Filing Date of Feb. 13, 2019, which claims priority to Japanese Application Serial No. 2018-025372, filed on Feb. 15, 2018. The disclosure of the prior application is considered part of the disclosure of this application, and is incorporated in its entirety into this application.

TECHNICAL FIELD

The present invention relates to a communication transmitting apparatus and a voice quality determination method for the communication transmitting apparatus, the communication transmitting apparatus being connected between telephones and performing arithmetic processing such as codec conversion processing for converting voice data to data conforming to a prescribed specification, echo cancellation processing for cancelling echo components, and the like.

BACKGROUND ART

A communication transmitting apparatus performs, between telephones, digital arithmetic processing on voice data to which voice signals including voice and sound other than voice are converted, such as codec conversion processing, echo cancellation processing, and the like.

In general, the codec conversion processing bidirectionally encodes (encoding) and decodes (decoding) data. In the codec conversion processing, voice data of a codec format from one telephone is converted into voice data of another codec format, different from the codec format, for allowing communication with the other telephone. The echo cancellation processing cancels echoes generated due to picking up voice emitted from a speaker of a telephone by a microphone or echoes generated due to mismatching of impedance in the middle of a path between telephones. The technology of such arithmetic processing is described in Non Patent Literature 1.

CITATION LIST

Non Patent Literature

NPL 1: Naofumi Aoki, "Acoustics for Beginners", 6th Impression, Kodansha Ltd., Jul. 3, 2017

SUMMARY OF THE INVENTION

Technical Problem

However, in the communication transmitting apparatus described above, due to an error in arithmetic processing, voice data before and after the arithmetic processing become different, and quality degradation occurs such as lowering of audibility of the voice after the arithmetic processing. When this quality degradation occurs, human ear can recognize the degradation of the voice, but the communication transmitting apparatus cannot determine the degradation of the voice. In other words, there has been a problem in that the quality degradation of the voice after the arithmetic processing during telephone conversation cannot be determined in the communication transmitting apparatus.

The present invention has been made in view of such circumstances, and an object of the present invention is to provide a communication transmitting apparatus and a voice quality determination method for the communication transmitting apparatus, which allow to appropriately determine quality degradation of voice after arithmetic processing such as codec conversion processing and echo cancellation processing performed by a telephone on voice data during telephone conversation.

Means for Solving the Problem

For solving the above problem, a communication transmitting apparatus according to claim 1 of the invention is a communication transmitting apparatus, connected between telephones, for performing arithmetic processing for converting voice data related to voice and sound other than voice input through a telephone into data conforming to a prescribed specification. The communication transmitting apparatus includes a storage unit configured to store tone data that is unique, the tone data being generated by digitizing sound having a unique frequency, an adding unit configured to add the tone data stored to the voice data transmitted from the telephone to generate addition data, an arithmetic processing unit configured to convert a format of the addition data according to the prescribed specification determined in advance to generate converted data including the voice data and the tone data, a separating unit configured to separate the tone data from the converted data, and a comparison determination unit configured to determine that if the tone data added to the voice data before conversion performed by the arithmetic processing unit is identical to the tone data separated by the separating unit after the conversion, there is no quality degradation of the voice data after the conversion, and if different, there is quality degradation.

A voice quality determination method according to claim 4 of the invention is a voice quality determination method for a communication transmitting apparatus, connected between telephones, for performing arithmetic processing for converting voice data related to voice and sound other than voice input through a telephone into data conforming to a prescribed specification, the communication transmitting apparatus including a storage unit configured to store tone data that is unique, the tone data being generated by digitizing sound having a unique frequency. The voice quality determination method includes adding the stored tone data to the voice data transmitted from the telephone to generate addition data, converting a format of the addition data according to the prescribed specification determined in advance to generate converted data including the voice data and the tone data, separating the tone data from the converted data, and determining that if the tone data added to the voice data before the conversion is identical to the tone data separated after the conversion, there is no quality degradation of the voice data after the conversion, and if different, there is quality degradation.

According to the configuration of claim 1 and the method of claim 4, after tone data is added to voice data during telephone conversation, the resulting data is converted according to a prescribed specification. If the tone data after the conversion is different from the tone data before the conversion, it is determined that there is quality degradation of the voice data. Thus, the quality degradation of voice during telephone conversation can be appropriately determined.

A communication transmitting apparatus according to claim 2 of the invention is a communication transmitting apparatus, connected between telephones, for performing arithmetic processing for converting voice data related to voice and sound other than voice input through a telephone into data conforming to a prescribed specification. The communication transmitting apparatus includes a storage unit configured to store tone data that is unique, the tone data being generated by digitizing sound having a unique frequency, an adding unit configured to add the tone data stored to the voice data transmitted from the telephone to generate addition data, an arithmetic processing unit including an echo cancelling unit configured to cancel an echo component superimposed on the voice data in the addition data and a codec conversion unit configured to convert the addition data to be input to the echo cancelling unit into data in a data format processable in echo component cancellation processing of the echo cancelling unit and convert a format of the addition data output from the echo cancelling unit, according to the prescribed specification determined in advance, to generate converted data including the voice data and the tone data, a separating unit configured to separate the tone data from the converted data, and a comparison determination unit configured to determine that if the tone data added to the voice data before conversion performed by the arithmetic processing unit is identical to the tone data separated by the separating unit after the conversion, there is no quality degradation of the voice data after the conversion, and if different, there is quality degradation.

A voice quality determination method according to claim 5 of the invention is a voice quality determination method for a communication transmitting apparatus, connected between telephones, for performing arithmetic processing for converting voice data related to voice and sound other than voice input through a telephone into data conforming to a prescribed specification, the communication transmitting apparatus including a storage unit configured to store tone data that is unique, the tone data generated by digitizing sound having a unique frequency. The voice quality determination method includes adding the tone data stored to the voice data transmitted from the telephone to generate addition data, converting the addition data of which an echo component is not cancelled yet, into data in a data format processable in cancellation processing for cancelling the echo component superimposed on the voice data in the addition data, cancelling the echo component, converting a format of the addition data after the cancelling of the echo component, according to the prescribed specification determined in advance, to generate converted data including the voice data and the tone data, separating the tone data from the converted data, and determining that if the tone data added to the voice data before the conversion is identical to the tone data separated after the conversion, there is no quality degradation of the voice data after the conversion, and if different, there is quality degradation.

According to the configuration of claim 2 and the method of claim 5, after tone data is added to voice data during telephone conversation, the resulting data is converted according to the prescribed specification. If the tone data after the conversion is different from the tone data before the conversion, it is determined that there is quality degradation of the voice data. Thus, the quality degradation of voice during telephone conversation can be appropriately determined. Furthermore, even in a case where an echo component is superimposed on the voice data from the telephone, the echo component can be cancelled.

The communication transmitting apparatus according to claim 3 of the invention is the communication transmitting apparatus according to claim 2 in which the echo cancelling unit includes an echo cancellation component cancelling unit configured to cancel an echo cancellation component added to the tone data in the addition data during the cancellation of the echo component.

According to this configuration, it is also possible to cancel the echo cancellation component added to the tone data in the addition data when the echo component superimposed on the voice data in the addition data is cancelled by the echo cancelling unit. Thus, the tone data in the addition data output from the echo cancelling unit can be output to the comparison determination unit as the tone data that has been added to the voice data prior to echo cancellation. As a result, the quality degradation can be appropriately determined by the comparison determination unit.

Effects of Invention

The present invention can provide a communication transmitting apparatus and a voice quality determination method for the communication transmitting apparatus, which appropriately determines quality degradation of voice after arithmetic processing such as codec conversion processing and echo cancellation processing performed by a telephone on voice data during telephone conversation.

DESCRIPTION OF EMBODIMENTS

Embodiments of the present invention will be described below with reference to the drawings.

Configuration of First Embodiment

Figure 1:
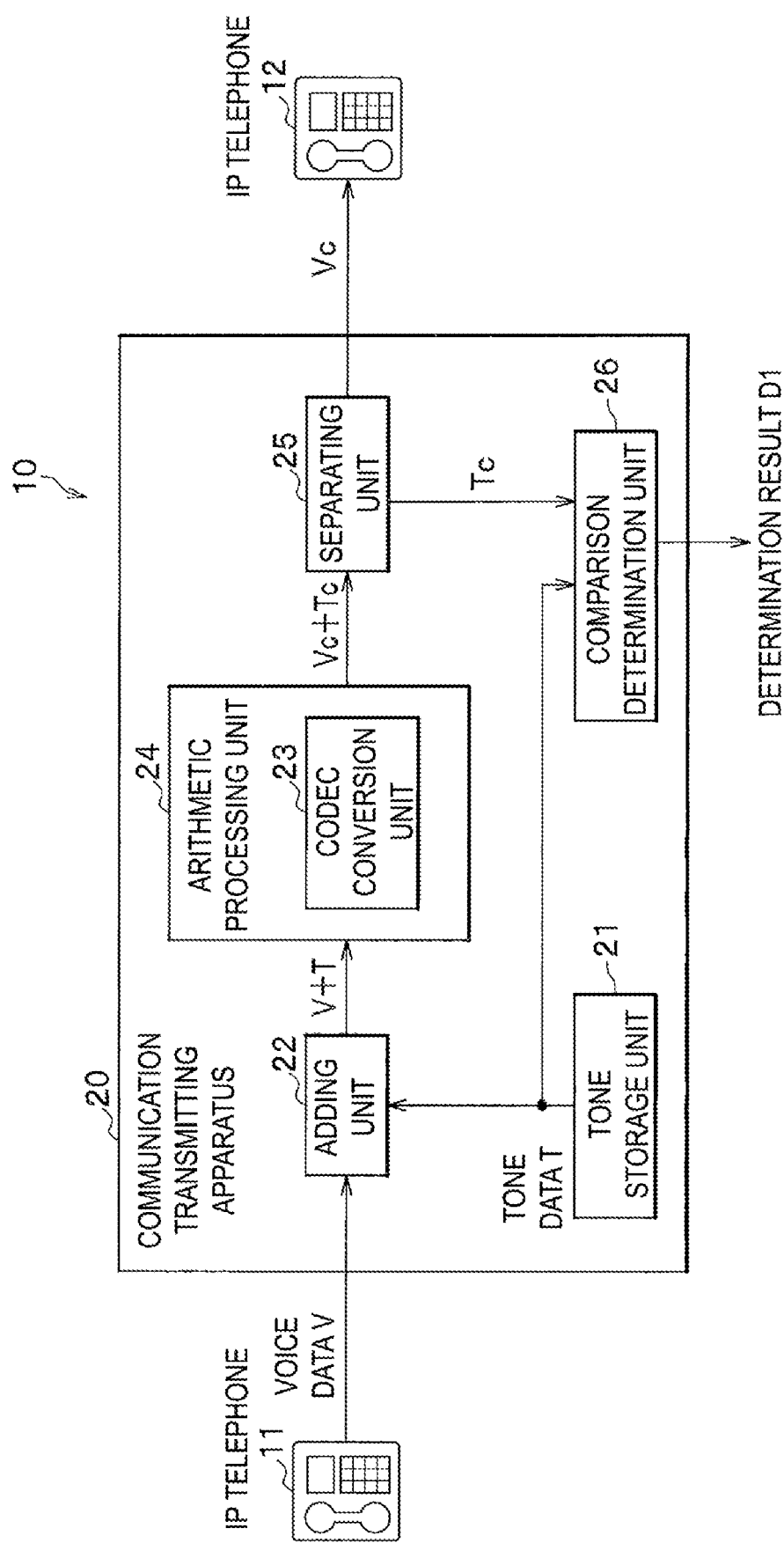
FIG. 1 is a block diagram illustrating a configuration of a telephone system applied with a communication transmitting apparatus according to a first embodiment of the present invention.

FIG. 1 is a block diagram illustrating a configuration of a telephone system applied with a communication transmitting apparatus according to a first embodiment of the present invention.

A telephone system 10 illustrated in FIG. 1 includes two Internet Protocol (IP) telephones 11 and 12, and a communication transmitting apparatus 20 connected between the IP telephones 11 and 12.

The communication transmitting apparatus 20 includes a tone storage unit (storage unit) 21, an adding unit 22, a digital arithmetic processing unit 24 including a codec conversion unit 23, a separating unit 25, and a comparison determination unit 26. The adding unit 22 and the separating unit 25 include a Digital Signal Processor (DSP) or the like. In the present example, a case will be described in which voice data is transmitted from one IP telephone 11 to the other IP telephone 12. Note that in the present embodiment, voice may include human voice and sound other than human voice.

The tone storage unit 21 stores tone data T used as voice data for transmission quality determination. The tone data T is waveform data generated by digitizing sound having a predetermined unique frequency. In the present example, one pair of IP telephones 11 and 12 is connected to the communication transmitting apparatus 20, and thus, only one tone data T is stored. However, when a plurality of pairs of IP telephones are connected, a plurality of different unique tone data T is stored.

The adding unit 22 adds the tone data T stored in the tone storage unit 21 to voice data V transmitted from the IP telephone 11, and outputs the voice data to which the tone data has been added (also referred to as addition data) V+T to the arithmetic processing unit 24.

The arithmetic processing unit 24 converts a format of the addition data V+T including the voice data V according to a prescribed specification. Here, the codec conversion unit 23 performs codec conversion, by using Digital/Digital (D/D) conversion process, to convert the addition data V+T including the voice data V in a codec format of the IP telephone 11 on the transmission side into voice data Vc in a different codec format allowing communication at the IP telephone 12 on the reception side. In this codec conversion, the tone data T is also converted to be tone data Tc. The converted data Vc+Tc having been converted is output to the separating unit 25.

The separating unit 25 separates the tone data Tc from the converted data Vc+Tc to output the tone data Tc to the comparison determination unit 26 and transmit the voice data Vc to the IP telephone 12 on the reception side.

The comparison determination unit 26 compares the tone data T output to the adding unit 22 before the codec conversion and the tone data Tc separated by the separating unit 25 after the codec conversion, and determines quality degradation of the voice. If the two data are the same, which means identical or substantially identical, it is determined that there is no quality degradation, and if different, it is determined that there is quality degradation. Furthermore, the comparison determination unit 26 transmits a determination result D1 indicating whether there is quality degradation or not to a maintenance terminal or the like (not illustrated).

Operation of First Embodiment

Next, operation of voice quality determination after arithmetic processing by the communication transmitting apparatus 20 according to the first embodiment will be described with reference to the flowchart of FIG. 2.

Figure 2:
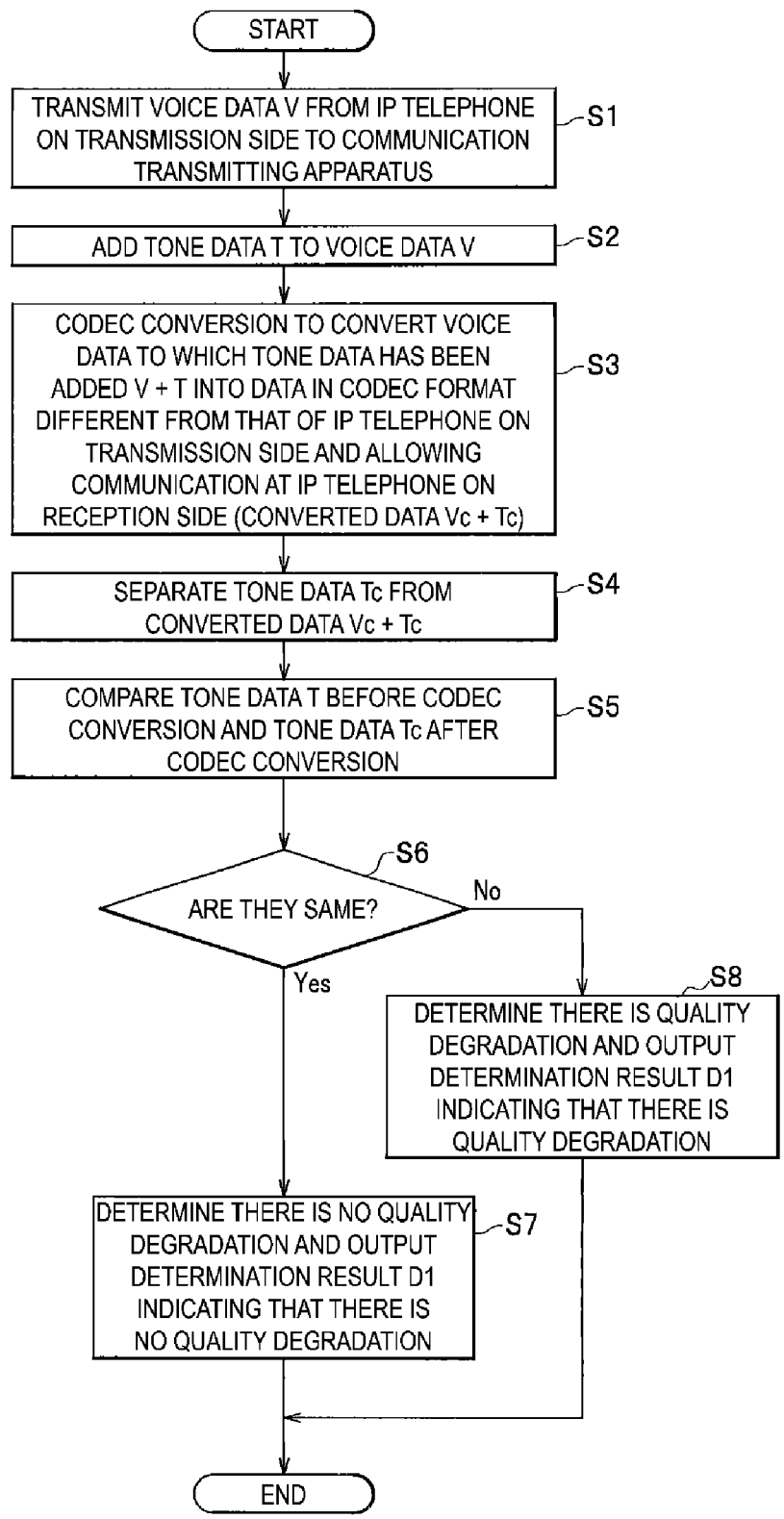
FIG. 2 is a flowchart for explaining operation of voice quality determination after arithmetic processing by the communication transmitting apparatus according to the first embodiment.

In step S1 illustrated in FIG. 2, it is assumed that a telephone conversation is started between the IP telephone 11 and the IP telephone 12, and the IP telephone 11 serves as a transmission side to transmit voice data V to the IP telephone 12. The transmitted voice data V is input to the communication transmitting apparatus 20.

In step S2, when the voice data V having been input is supplied to the adding unit 22 of the communication transmitting apparatus 20, the adding unit 22 adds tone data T stored in the tone storage unit 21 to the voice data V, and outputs the voice data to which the tone data has been added (addition data) V+T to the arithmetic processing unit 24.

In step S3, the arithmetic processing unit 24 performs codec conversion, by the codec conversion unit 23, to convert the addition data V+T into data in a codec format that is different from the codec format of the IP telephone 11 on the transmission side and allows communication at the IP telephone 12 on the reception side. That is, in this codec conversion, the added data V+T is converted into voice data Vc+tone data Tc. The converted data Vc+Tc having been converted is output to the separating unit 25.

In step S4, the separating unit 25 separates the tone data Tc from the converted data Vc+Tc to output the tone data Tc to the comparison determination unit 26 and transmit the voice data Vc to the IP telephone 12 on the reception side.

The comparison determination unit 26 compares, in step S5, the tone data T output to the adding unit 22 before the codec conversion and the tone data Tc separated by the separating unit 25 after the codec conversion, and determines, in step S6, quality degradation of the voice. That is, in step S6, it is determined whether the two data are the same or not.

As a result of this determination, if the two data are the same (Yes), the operation proceeds to step S7 in which it is determined that there is no quality degradation, and a determination result D1 indicating that there is no quality degradation is transmitted to a maintenance terminal or the like (not illustrated). On the other hand, if the two data are different (No) in step S6, the operation proceeds to step S8 in which it is determined that there is quality degradation, and a determination result D1 indicating that there is quality degradation is transmitted to a maintenance terminal or the like (not illustrated).

Note that, in a case where the determination result D1 indicating that there is quality degradation is transmitted to a maintenance terminal, processing may be performed to disconnect a line between the IP telephones 11 and 12 during the telephone conversation.

Effect of First Embodiment

Effect of the communication transmitting apparatus 20 according to the first embodiment will be described. The communication transmitting apparatus 20 is connected between the IP telephones 11 and 12, and performs arithmetic processing to convert voice data V related to voice and sound other than voice input through the IP telephone 11, for example, into data conforming to a prescribed specification.

The communication transmitting apparatus 20 includes the tone storage unit 21, the adding unit 22, the arithmetic processing unit 24, the separating unit 25, and the comparison determination unit 26.

The tone storage unit 21 stores unique tone data T being waveform data generated by digitizing sound having a unique frequency.

The adding unit 22 adds stored tone data T to voice data V transmitted from the IP telephones 11 and 12 to generate addition data V+T.

The arithmetic processing unit 24 converts a format of the addition data V+T according to a prescribed specification determined in advance, and generates converted data Vc+Tc including the converted voice data Vc and tone data Tc.

The separating unit 25 separates the tone data Tc from the converted data Vc+Tc.

The comparison determination unit 26 determines that there is no quality degradation in the voice data Vc if the tone data T added to the voice data V before the conversion performed by the arithmetic processing unit 24 and the tone data Tc separated from the voice data Vc by the separating unit 25 after the conversion are the same, and determines that there is quality degradation if the two data are different.

According to this configuration, voice data V during telephone conversation is added with tone data T and then is converted according to a prescribed specification by the arithmetic processing unit 24. If the tone data Tc after the conversion and the tone data T before the conversion are different, it can be determined that there is quality degradation of the voice data Vc. Thus, the quality degradation of voice during telephone conversation can be appropriately determined.

Configuration of Second Embodiment

Figure 3:
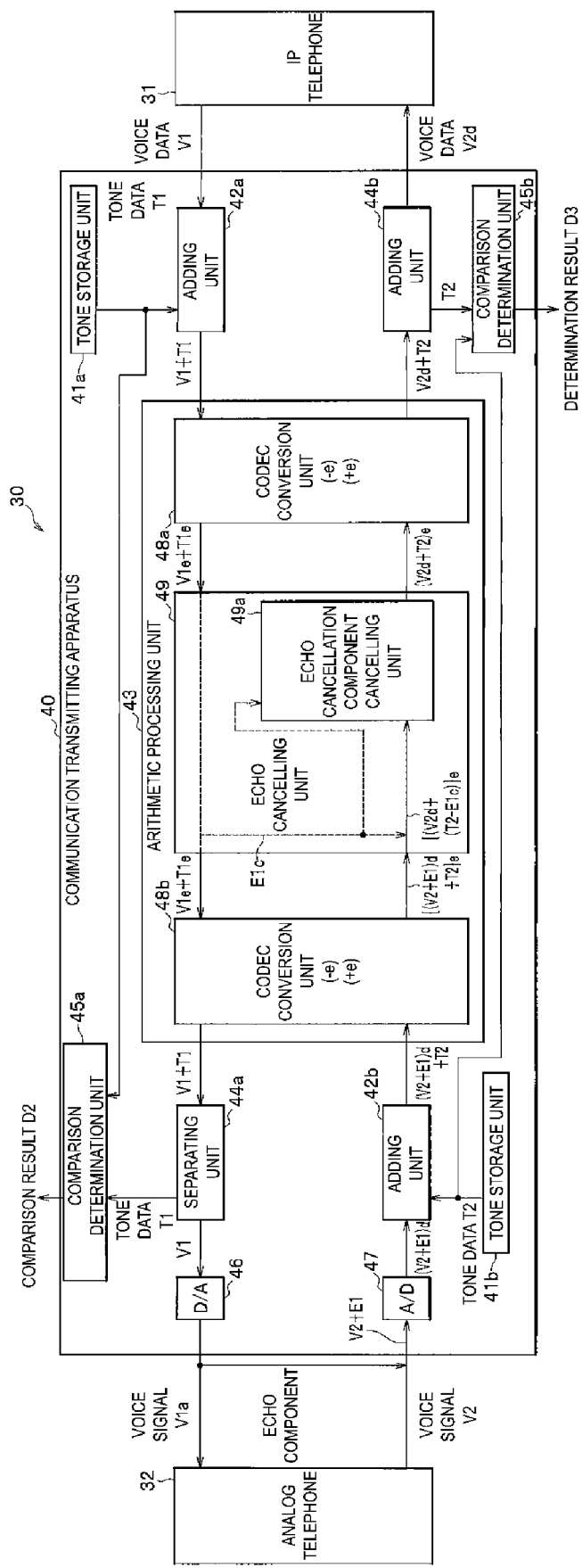
FIG. 3 is a block diagram illustrating a configuration of a telephone system applied with a communication transmitting apparatus according to a second embodiment of the present invention.

FIG. 3 is a block diagram illustrating a configuration of a telephone system applied with a communication transmitting apparatus according to a second embodiment of the present invention.

A telephone system 30 illustrated in FIG. 3 includes an IP telephone 31, an analog telephone 32, and a communication transmitting apparatus 40 connected between the IP telephone 31 and the analog telephone 32.

The communication transmitting apparatus 40 includes tone storage units (storage units) 41a and 41b, adding units 42a and 42b, a digital arithmetic processing unit 43, separating units 44a and 44b, comparison determination units 45a and 45b, a D/A conversion unit (illustrated as D/A in the figure) 46, and an A/D conversion unit (illustrated as A/D in the figure) 47. The arithmetic processing unit 43 includes codec conversion units 48a and 48b on an input/output side and an echo cancelling unit 49 connected between the codec conversion units 48a and 48b. The echo cancelling unit 49 includes an echo cancellation component cancelling unit 49a.

The adding units 42a and 42b and the separating units 44a and 44b include DSP or the like. In the present example, a case will be described in which voice data is transmitted from the IP telephone 31 to the analog telephone 32, and then a voice signal from the analog telephone 32 is transmitted to the IP telephone 31.

The tone storage unit 41a stores tone data T1 used as voice data for transmission quality determination. The tone storage unit 41b stores tone data T2 different from the tone data T1. The tone data T1 is unique waveform data generated by digitizing sound having a predetermined unique frequency f1. The tone data T2 is unique waveform data generated by digitizing sound having a unique frequency f2 different from the frequency of the tone data T1. Note that when a plurality of IP telephones and a plurality of analog telephones are connected to the communication transmitting apparatus 40, the tone storage units 41a and 41b store a plurality of different and unique tone data. The two tone storage units 41a and 41b illustrated in FIG. 3 may be integrated into a single unit.

The adding unit 42a adds tone data T1 stored in the tone storage unit 41a to voice data V1 transmitted from the IP telephone 31, and outputs the voice data to which the tone data has been added (addition data) V1+T1 to the arithmetic processing unit 43.

The arithmetic processing unit 43 performs arithmetic processing by codec conversion processing and echo cancellation processing described below by using the codec conversion units 48a and 48b and the echo cancelling unit 49.

On a side where voice data from a telephone is input, the codec conversion units 48a and 48b convert, by using D/D conversion process, the voice data into data in a data format processable in echo component cancellation processing operation of the echo cancelling unit 49. On a side where voice data in which an echo component is cancelled is output to a telephone, the codec conversion unit 48a or 48b perform codec conversion processing to convert the voice data into voice data in a codec format which can be received at a telephone of the transmission destination.

For example, the codec conversion unit 48a, which serves as the input side when voice data V1 from the IP telephone 31 is input, converts addition data V1+T1 including the voice data V1 into data in a data format (addition data V1e+T1e) processable in the echo component cancellation processing operation of the echo cancelling unit 49. On the other hand, the codec conversion unit 48b, which serves as the output side, performs codec conversion (−e) to convert the addition data V1e+T1e including the voice data V1e output from the echo cancelling unit 49 into addition data V1+T1 in a codec format allowing communication at a switchboard (not illustrated) on a side of the analog telephone 32 of the transmission destination.

The separating unit 44a separates the tone data T1 from the addition data V1+T1 to output the tone data T1 to the comparison determination unit 45a and output the voice data V1 to the D/A conversion unit 46. The D/A conversion unit 46 converts the voice data V1 into an analog voice signal V1a.

The comparison determination unit 45a compares the tone data T1 output to the adding unit 42a before the arithmetic processing and the tone data T1 separated by the separating unit 44a after the arithmetic processing, and determines quality degradation of the voice. If the two data are the same, it is determined that there is no quality degradation, and if different, it is determined that there is quality degradation. Furthermore, the comparison determination unit 45a transmits a determination result D2 indicating whether there is quality degradation or not to a maintenance terminal or the like (not illustrated).

The analog telephone 32 receives the voice signal V1a to output sound from a speaker (not illustrated), and transmits a voice signal V2 corresponding to sound input from a microphone (not illustrated) to the IP telephone 31. Here, superimposed data that is formed when an echo component E originated from the voice signal V1a output from the speaker is input to the microphone and superimposed on the voice signal V2, is represented by the code V2+E1.

The A/D conversion unit 47 digitally converts the analog superimposed data V2+E1, and outputs superimposed data (V2+E1)d.

The adding unit 42b adds tone data T2 stored in the tone storage unit 41b to the superimposed data (V2+E1)d including the voice data V2d, and outputs the addition data (V2+E1)d+T2 to the codec conversion unit 48b.

The codec conversion unit 48b converts, by using D/D conversion process, the addition data (V2+E1)d+T2 including the voice data V2 into addition data {(V2+E1)d+T2}e in a data format processable in the echo component cancellation processing operation of the echo cancelling unit 49.

The echo cancelling unit 49 cancels the echo component E superimposed on the voice signal V2 of the addition data {(V2+E1)d+T2}e. When the addition data {(V2+E1)d+T2}e is input, the echo cancelling unit 49 changes a filter coefficient and estimates an echo cancellation component E1c, based on the echo component E superimposed on the voice signal V2 by the analog telephone 32 and the voice data V1e input from the IP telephone 31 before the input of the echo component E1. The echo cancellation component E1 is identical or substantially identical to the echo component E1.

The echo cancelling unit 49 subtracts the echo cancellation component E1 from the addition data {(V2+E1)d+T2}e to cancel the echo component E1. In other words, the echo cancellation component E1 is subtracted from the superimposed data (V2+E1)d to cancel the echo component E1, obtaining the voice data V2d. At this time, the echo cancellation component E1 is subtracted also from the tone data T2, resulting in tone data T2-E1c to which the echo cancellation component E1c is added. The resulting addition data {V2d+(T2-E1c)}e is input to the echo cancellation component cancelling unit (also referred to as a component cancelling unit) 49a.

The component cancelling unit 49a adds the echo cancellation component E1 to the tone data T2-E1c of the addition data {V2d+(T2-E1c)}e to cancel the echo cancellation component E1c. As a result, addition data (V2d+T2)e in which the tone data T2 is added to the voice data V2d is generated and is output to the codec conversion unit 48a.

The codec conversion unit 48a performs codec conversion (−e) to convert the addition data (V2d+T2)e into addition data V2d+T2 in a codec format which can be received at the IP telephone 31 of the transmission destination to output the data to the separating unit 44b.

The separating unit 44b separates the tone data T2 from the addition data V2d+T2 to output the tone data T2 to the comparison determination unit 45b and output the voice data V2d to the IP telephone 31.

The comparison determination unit 45b compares the tone data T2 output to the adding unit 42b before the arithmetic processing and the tone data T2 separated by the separating unit 44b after the arithmetic processing, and determines that there is no quality degradation if the two data are the same and that there is quality degradation if different. Furthermore, the comparison determination unit 45b transmits a determination result D2 indicating whether there is quality degradation or not to a maintenance terminal or the like (not illustrated).

Operation of Second Embodiment

Next, operation of voice quality determination after arithmetic processing by the communication transmitting apparatus 20 according to the second embodiment will be described with reference to the flowchart of FIG. 4.

Figure 4:
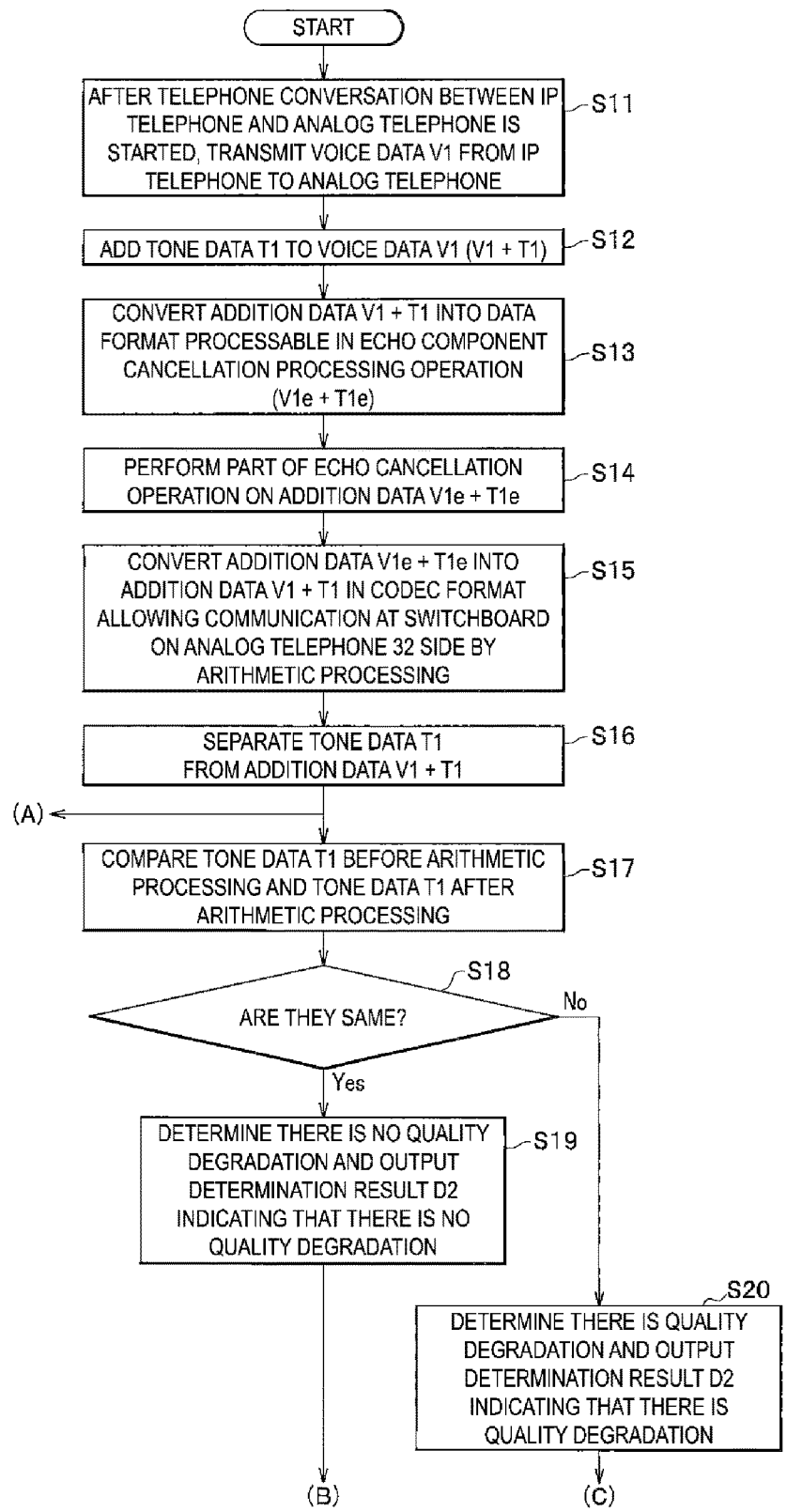
FIG. 4 is a first flowchart for explaining operation of voice quality determination after arithmetic processing by the communication transmitting apparatus according to the second embodiment.

In step S11 illustrated in FIG. 4, it is assumed that a telephone conversation is started between the IP telephone 31 and the analog telephone 32, and the IP telephone 31 first serves as a transmission side to transmit voice data V1 to the analog telephone 32. The transmitted voice data V1 is input to the communication transmitting apparatus 40.

In step S12, when the voice data V1 having been input is supplied to the adding unit 42a of the communication transmitting apparatus 40, the adding unit 42a adds tone data T1 stored in the tone storage unit 41a to the voice data V1, and outputs the addition data V1+T1 to the arithmetic processing unit 43.

In step S13, the arithmetic processing unit 43 converts, by the codec conversion unit 48a, the addition data V1+T1 into data in a data format processable in the echo component cancellation processing operation of the echo cancelling unit 49. In step S14, the converted addition data V1e+T1e is input to the other codec conversion unit 48b after a part of the echo cancellation operation described below is performed in the echo cancelling unit 49.

In step S15, the codec conversion unit 48b performs codec conversion (−e) to convert the addition data V1e+T1e into addition data V1+T1 in a codec format allowing communication at a switchboard (not illustrated) on a side of the analog telephone 32 of the transmission destination. The addition data V1+T1 is output to the separating unit 44.

In step S16, the separating unit 44a separates the tone data T1 from the addition data V1+T1 to output the tone data T1 to the comparison determination unit 45a and output the voice data V1 to the D/A conversion unit 46.

The comparison determination unit 45a compares, in step S17, the tone data T1 output to the adding unit 42a before the arithmetic processing and the tone data T1 separated by the separating unit 44a after the arithmetic processing, and determines, in step S18, quality degradation of the voice. That is, in step S17, it is determined whether the two data are the same or not.

As a result of this determination, if the two data are the same (Yes), the operation proceeds to step S19 in which it is determined that there is no quality degradation, and a determination result D2 indicating that there is no quality degradation is transmitted to a maintenance terminal or the like (not illustrated). On the other hand, if the two data are different (No) in step S18, the operation proceeds to step S20 in which it is determined that there is quality degradation, and a determination result D2 indicating that there is quality degradation is transmitted to a maintenance terminal or the like (not illustrated).

Note that, in a case where the determination result D2 indicating that there is quality degradation is transmitted to a maintenance terminal, processing may be performed to disconnect a line between the IP telephones 31 and the analog telephone 32 during the telephone conversation.

Figure 5:
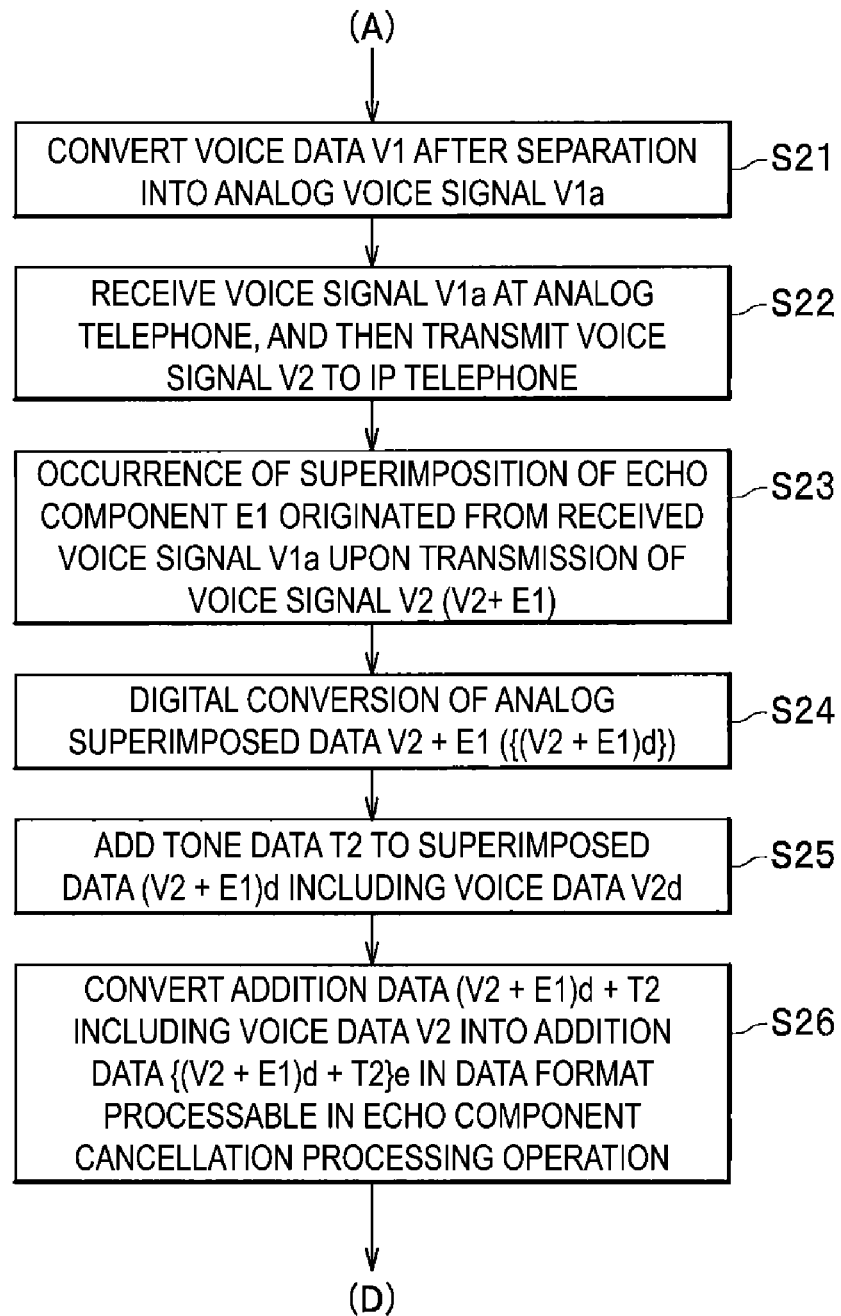
FIG. 5 is a second flowchart for explaining operation of voice quality determination after arithmetic processing by the communication transmitting apparatus according to the second embodiment.

Referring to FIG. 5, in step S21, the D/A conversion unit 46 converts the voice data V1 after the separation in step S16 into an analog voice signal V1a. The converted voice signal V1a is transmitted to the analog telephone 32.

In step S22, the analog telephone 32 receives the voice signal Via to output sound from a speaker (not illustrated), and transmits a voice signal V2 corresponding to human voice input from a microphone (not illustrated) to the IP telephone 31. Here, in step S23, it is assumed that an echo component E originated from the voice signal Via output from the speaker is input to the microphone and superimposed on the voice signal V2 (V2+E1).

In step S24, the A/D conversion unit 47 digitally converts {(V2+E1)d} the analog superimposed data V2+E1.

In step S25, the adding unit 42b adds tone data T2 stored in the tone storage unit 41b to the superimposed data (V2+E1)d including the voice data V2d, and outputs the addition data (V2+E1)d+T2 to the codec conversion unit 48b.

In step S26, the codec conversion unit 48b converts the addition data (V2+E1)d+T2 including the voice data V2 into addition data {(V2+E1)d+T2}e in a data format processable in the echo component cancellation processing operation of the echo cancelling unit 49.

Figure 6:
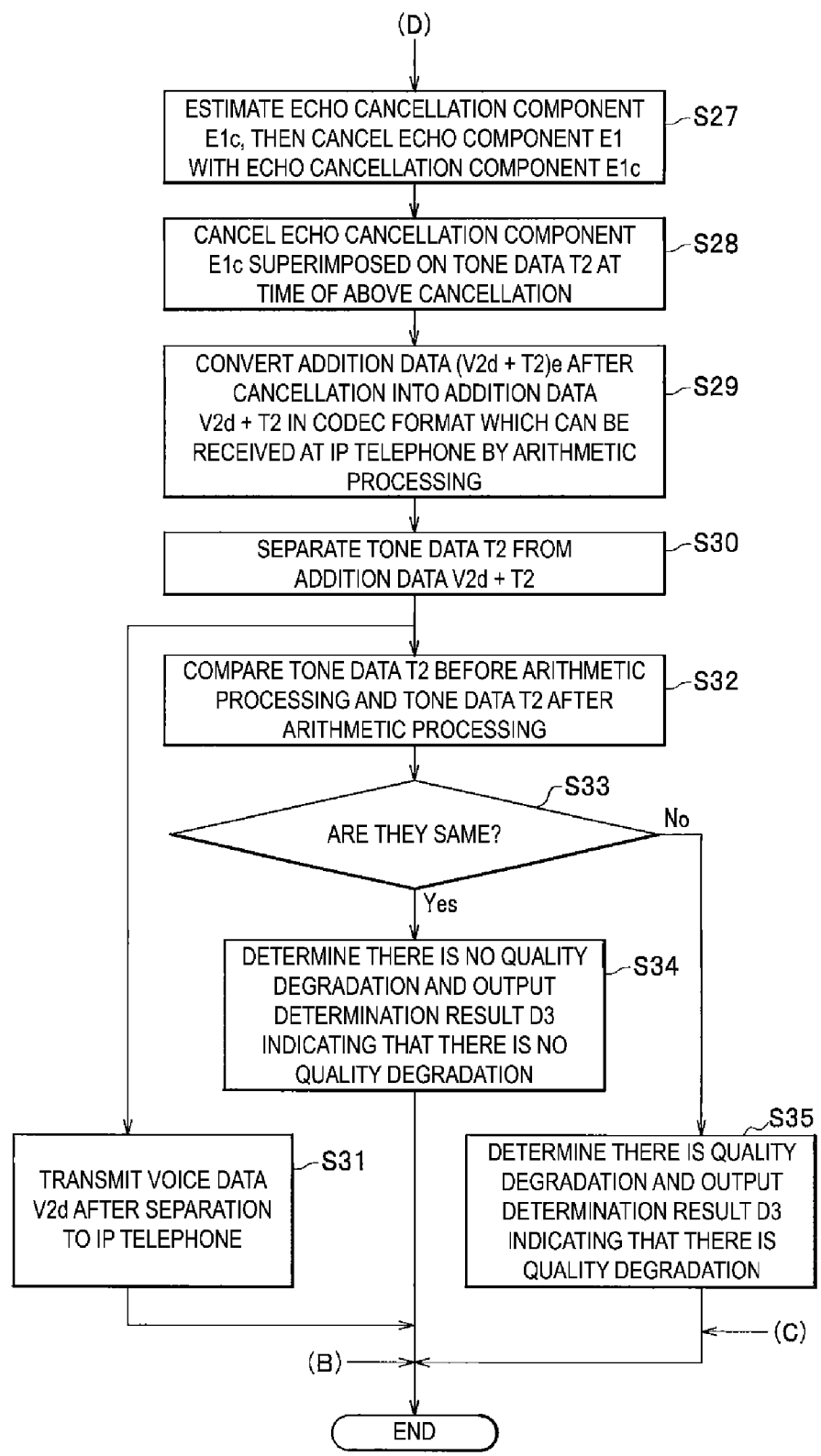
FIG. 6 is a third flowchart for explaining operation of voice quality determination after arithmetic processing by the communication transmitting apparatus according to the second embodiment.

Proceeding to FIG. 6, in step S27, when the addition data {(V2+E1)d+T2}e is input, the echo cancelling unit 49 changes a filter coefficient and estimates an echo cancellation component E1$c$, based on the echo component E1 superimposed on the voice signal V2 at the analog telephone 32 and the voice data V1$e$ input from the IP telephone 31 before the echo component E1 is input. Furthermore, the echo cancelling unit 49 subtracts the estimated echo cancellation component E1$c$ from the addition data {(V2+E1)d+T2}e to cancel the echo component E1.

This cancellation provides the voice data V2$d$, but at the time of cancellation, the echo cancellation component E1$c$ is subtracted also from the tone data T2, resulting in tone data T2-E1$c$. The resulting addition data {V2$d$+(T2-E1$c$)}e is input to the component cancelling unit 49*a*.

In step S28, the component cancelling unit 49*a* adds the echo cancellation component E1$c$ to the tone data T2-E1$c$ of the addition data {V2$d$+(T2-E1$c$)}e to cancel the echo cancellation component E1$c$. As a result, addition data (V2$d$+T2)e in which the tone data T2 is added to the voice data V2$d$ is generated and is output to the codec conversion unit 48*a*.

In step S29, the codec conversion unit 48*a* performs codec conversion (-e) to convert the addition data (V2$d$+T2)e into addition data V2$d$+T2 in a codec format which can be received at the IP telephone 31 of the transmission destination, and outputs the addition data V2$d$+T2 to the separating unit 44*b*.

In step S30, the separating unit 44*b* separates the tone data T2 from the addition data V2$d$+T2 to output the tone data T2 to the comparison determination unit 45*b* and transmit the voice data V2$d$ to the IP telephone 31.

In step S31, the separating unit 44*b* transmits the voice data V2$d$ after the separation to the IP telephone 31.

The comparison determination unit 45*b* compares, in step S32, the tone data T2 output to the adding unit 42*b* before the arithmetic processing and the tone data T2 separated by the separating unit 44*b* after the arithmetic processing, and determines, in step S33, quality degradation of the voice. That is, in step S32, it is determined whether the two data are the same or not.

As a result of this determination, if the two data are the same (Yes), the operation proceeds to step S34 in which it is determined that there is no quality degradation, and a determination result D3 indicating that there is no quality degradation is transmitted to a maintenance terminal or the like (not illustrated). On the other hand, if the two data are different (No) in step S33, the operation proceeds to step S35 in which it is determined that there is quality degradation, and a determination result D3 indicating that there is quality degradation is transmitted to a maintenance terminal or the like (not illustrated).

Note that, in a case where the determination result D3 indicating that there is quality degradation is transmitted to a maintenance terminal, processing may be performed to disconnect a line between the IP telephones 31 and the analog telephone 32 during the telephone conversation.

Effect of Second Embodiment

The effect of the communication transmitting apparatus 40 according to the second embodiment will be described. The communication transmitting apparatus 40 is connected between the IP telephones 31 and the analog telephone 32, and performs arithmetic processing to convert voice data V1 or V2 related to voice and sound other than voice input through the IP telephone 31 or the analog telephone 32, for example, into data conforming to a prescribed specification.

(1) The communication transmitting apparatus 40 includes the tone storage units (storage units) 41*a* and 41*b*, the adding units 42*a* and 42*b*, the digital arithmetic processing unit 43, the separating units 44*a* and 44*b*, and the comparison determination units 45*a* and 45*b*.

The tone storage units 41*a* and 41*b* store unique tone data T1 and T2, respectively, which are data generated by digitizing sounds having unique frequencies f1 and f2, respectively. The adding unit 42*b* adds the tone data T2 stored in the tone storage unit 41*b* to the voice data V2 input from the analog telephone 32 to generate addition data (V2+E1)d+T2.

The echo cancelling unit 49 of the arithmetic processing unit 43 cancels the echo component E1 superimposed on the voice data V2$d$ in the addition data (V2+E1)d+T2. The codec conversion unit 48*b* converts the addition data (V2+E1)d+T2 input to the echo cancelling unit 49, into data in a data format processable in the echo component cancellation processing of the echo cancelling unit 49. The codec conversion unit 48*a* converts, according to a prescribed specification determined in advance, a format of the addition data (V2$d$+T2)e output from the e echo cancelling unit 49 to generate converted data V2$d$+T2 including the voice data V2$d$ and the tone data T2.

The separating unit 44*b* separates the tone data T2 from the converted data V2$d$+T2. The comparison determination unit 45*b* determines that there is no quality degradation in the voice data V2$d$ after conversion if the tone data T2 added to the voice data V2 before the conversion performed by the arithmetic processing unit 43 and the tone data T2 separated by the separating unit 44*b* after the conversion are the same, and determines that there is quality degradation if the two tone data T2 are different.

According to this configuration, voice data V2 during telephone conversation is added with tone data T2 and then is converted according to a prescribed specification by the arithmetic processing unit 43. If the tone data T2 after the conversion and the tone data T2 before the conversion are different, it is determined that there is quality degradation of the voice data V2$d$. Thus, the quality degradation of voice during telephone conversation can be appropriately determined. Furthermore, even in a case where an echo component E1 is superimposed on the voice data V2 from the analog telephone 32, the echo component E1 can be cancelled.

(2) The echo cancelling unit 49 includes the echo cancellation component cancelling unit configured to cancel an echo cancellation component E1$c$ added to the tone data in the addition data during the cancellation for the echo component E1.

According to this configuration, it is also possible to cancel an echo cancellation component E1$c$ added to the tone data T2 in the addition data when the echo component E1 superimposed on the voice data V2 in the addition data is cancelled by the echo cancelling unit. Thus, the tone data T2 in the addition data output from the echo cancelling unit 49 can be output to the comparison determination unit 45*b* as tone data T2 that has been added to the voice data V2 prior to echo cancellation. As a result, the quality degradation can be appropriately determined by the comparison determination unit 45*b*.

In addition to the above, specific configurations can be changed as appropriate without departing from the spirit of the present invention.

The invention claimed is:

1. A communication transmitting apparatus comprising:
a storage unit configured to store tone data that is unique, the tone data being generated by digitizing sound having a unique frequency;
an adding unit, including one or more processors, configured to (i) receive voice data transmitted from a first telephone connected at a transmission side of the communication transmitting apparatus, (ii) add the stored tone data to the received voice data, and (iii) generate addition data from a result of the stored tone data added to the received voice data;
an arithmetic processing unit configured to convert a format of the addition data according to a prescribed specification that is determined in advance to generate converted data, the converted data including the voice data as converted voice data and the tone data as converted tone data;
a separating unit, including the one or more processors, configured to (i) separate the converted voice data and the converted tone data from the converted data and (ii) transmit the separated voice data to a second telephone connected at a reception side of the communication transmitting apparatus; and
a comparison determination unit configured to compare (i) the tone data added to the voice data to (ii) the separated tone data separated by the separating unit, and in response to the comparison, determine:
there is no quality degradation of the separated voice data after the conversion when the tone data matches to the separated tone data, and
there is quality degradation of the separated voice data after the conversion when the tone data is different than the separated tone data,
wherein in response to determining there is quality degradation of the separated voice data after the conversion, a line connecting the first telephone at the transmission side and the second telephone connected at the reception side is disconnected.

2. The communication transmitting apparatus according to claim 1, wherein the first telephone connected at the transmission side is an Internet Protocol (IP) telephone and the second telephone connected at the reception side is an IP telephone.

3. The communication transmitting apparatus according to claim 1, wherein the comparison determination unit is configured to transmit a determination result based upon the quality degradation.

4. A communication transmitting apparatus comprising:
a storage unit configured to store tone data that is unique, the tone data being generated by digitizing sound having a unique frequency;
an adding unit, including one or more processors, configured to (i) receive voice data transmitted from a first telephone connected at a transmission side of the communication transmitting apparatus, (ii) add the stored tone data to the received voice data, and (iii) generate addition data from a result of the stored tone data added to the received voice data;
an arithmetic processing unit including:
an echo cancelling unit configured to cancel an echo component superimposed on the voice data in the addition data; and
a codec conversion unit configured to convert the addition data to be input to the echo cancelling unit into data in a data format that is processable using echo component cancellation processing by the echo cancelling unit and convert a format of the addition data output by the echo cancelling unit, according to a prescribed specification determined in advance, to generate converted data, the converted data including the voice data as converted voice data and the tone data as converted tone data;
a separating unit, including the one or more processors, configured to (i) separate the converted voice data and the converted tone data from the converted data and (ii) transmit the separated voice data to a second telephone connected at a reception side of the communication transmitting apparatus; and
a comparison determination unit configured to compare (i) the tone data added to the voice data to (ii) the separated tone data separated by the separating unit, and in response to the comparison, determine:
there is no quality degradation of the separated voice data after the conversion when the tone data is matches to the separated tone data, and
there is quality degradation of the separated voice data after the conversion when the tone data is different than the separated tone data,
wherein in response to determining there is quality degradation of the of the separated voice data after the conversion, a line connecting the first telephone at the transmission side and the second telephone connected at the reception side is disconnected.

5. The communication transmitting apparatus according to claim 4, wherein:
the echo cancelling unit includes an echo cancellation component cancelling unit configured to cancel an echo cancellation component added to the tone data in the addition data during the cancellation of the echo component.

6. The communication transmitting apparatus according to claim 4, wherein the first telephone is an Internet Protocol (IP) telephone and the second telephone is an analog telephone.

7. The communication transmitting apparatus according to claim 4, wherein the first telephone is an analog telephone and the second telephone is an Internet Protocol (IP) telephone.

8. A voice quality determination method for a communication transmitting apparatus, connected between telephones, for performing arithmetic processing for converting voice data related to voice and sound other than voice input through one of the telephones where the voice data is input into converted data conforming to a prescribed specification, the communication transmitting apparatus including a storage unit configured to store tone data that is unique, the tone data being generated by digitizing sound having a unique frequency, the voice quality determination method comprising:
receiving the voice data from a first telephone connected at a transmission side of the communication transmitting apparatus;
adding the stored tone data to the received voice data;
generating addition data from a result of the stored tone data added to the received voice data;
converting a format of the addition data according to the prescribed specification that is determined in advance to generate converted data, the converted data including the voice data as converted voice data and the tone data as converted tone data;
separating the converted voice data and the converted tone data from the converted data;
transmitting the separated voice data to a second telephone connected at a reception side of the communication transmitting apparatus and configured to output the converted voice data;
comparing (i) the tone data added to the voice data to (ii) the separate tone data, and in response to the comparison:
determining there is no quality degradation of the separated voice data after the conversion when the tone data matches to the separated tone data;
determining there is quality degradation of the separated voice data after the conversion when the tone data is different than the separated tone data; and
in response to determining there is quality degradation of the separated voice data after the conversion, disconnecting a line that connects the first telephone at the transmission side and the second telephone connected at the reception side.

9. The voice quality determination method according to claim 8, wherein the first telephone is configured to provide the voice data is an Internet Protocol (IP) telephone and the second telephone is configured to output the converted voice data is an IP telephone.

10. The voice quality determination method according to claim 8, comprising transmitting a determination result based upon the quality degradation.

11. The voice quality determination method according to claim 8, comprising determining a quality of degradation of the voice data based upon the quality of degradation.

12. A voice quality determination method for a communication transmitting apparatus, connected between telephones, for performing arithmetic processing for converting voice data related to voice and sound other than voice input through a first one of the telephones where the voice data is input into converted data conforming to a prescribed specification, the communication transmitting apparatus including a storage unit configured to store tone data that is unique, the data being generated by digitizing sound having a unique frequency, the voice quality determination method comprising:
receiving the voice data from a first telephone connected at a transmission side of the communication transmitting apparatus;
adding the tone data stored to the received voice data;
generating addition data from a result of the stored tone data added to received voice data;
converting the addition data including an echo component that is not cancelled into data in a data format that is processable by cancellation processing to cancel the echo component superimposed on the voice data transmitted from the first telephone in the addition data;
cancelling the echo component;
converting a format of the addition data after the cancelling of the echo component, according to the prescribed specification, to generate converted data, the converted data including the voice data as converted voice data and the tone data as converted tone data;
separating the converted voice data and the converted tone data from the converted data;
transmitting the separated voice data to a second telephone connected at a reception side of the communication transmitting apparatus; and
comparing (i) the tone data added to the voice data to (ii) the separated tone data, and in response to the comparison:
determining there is no quality degradation of the separated voice data after the conversion when the tone data matches to the separated tone data;
determining there is quality degradation of the separated voice data after the conversion when the tone data is different than the separated tone data; and
in response to determining there is quality degradation of the separated voice data after the conversion, disconnecting a line that connects the first telephone at the transmission side and the second telephone connected at the reception side.

13. The voice quality determination method according to claim 12, wherein the first telephone is an Internet Protocol (IP) telephone and the second telephone is an analog telephone.

14. The voice quality determination method according to claim 12, wherein the first telephone is an analog telephone and the second telephone is an Internet Protocol (IP) telephone.

15. The voice quality determination method according to claim 12, comprising transmitting a determination result based upon the quality degradation.

* * * * *